United States Patent
Chen

(10) Patent No.: US 10,037,363 B2
(45) Date of Patent: Jul. 31, 2018

(54) METHOD AND DEVICE FOR DISPLAYING SEARCH RESULT ON MOBILE TERMINAL

(71) Applicant: BAIDU ONLINE NETWORK TECHNOLOGY (BEIJING) CO., LTD., Beijing (CN)

(72) Inventor: Yangkun Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 325 days.

(21) Appl. No.: 14/567,004

(22) Filed: Dec. 11, 2014

(65) Prior Publication Data

US 2015/0161220 A1 Jun. 11, 2015

(30) Foreign Application Priority Data

Dec. 11, 2013 (CN) .......................... 2013 1 0676633

(51) Int. Cl.
| | | |
|---|---|---|
| *G06F 7/00* | (2006.01) | |
| *G06F 17/30* | (2006.01) | |
| *G06F 9/48* | (2006.01) | |

(52) U.S. Cl.
CPC ...... *G06F 17/30554* (2013.01); *G06F 9/4806* (2013.01)

(58) Field of Classification Search
CPC .......................... G06F 17/30554; G06F 9/4806
See application file for complete search history.

(56) References Cited

U.S. PATENT DOCUMENTS

| | | | | |
|---|---|---|---|---|
| 2012/0284247 | A1* | 11/2012 | Jiang | ................. G06F 17/30867 707/706 |
| 2013/0018939 | A1* | 1/2013 | Chawla | ................... H04L 67/08 709/203 |
| 2013/0031078 | A1 | 1/2013 | El Daher et al. | |
| 2014/0250106 | A1* | 9/2014 | Shapira | ............. G06F 17/30864 707/722 |

FOREIGN PATENT DOCUMENTS

| | | |
|---|---|---|
| CN | 101252750 A | 8/2008 |
| CN | 101916265 A | 12/2010 |
| CN | 102549573 A | 7/2012 |
| CN | 102999619 A | 3/2013 |
| CN | 103617285 A | 3/2014 |

(Continued)

OTHER PUBLICATIONS

Chinese Patent Application No. 201310676633.X First Office Action dated Apr. 1, 2016, with English translation, 12 pages.

(Continued)

*Primary Examiner* — Tuan A Pham
*Assistant Examiner* — Thai V Dang
(74) *Attorney, Agent, or Firm* — Lathrop Gage LLP

(57) ABSTRACT

A method for displaying a search result on a mobile terminal and a device for displaying a search result on a mobile terminal are provided. The method for displaying the search result on the mobile terminal comprises sending a search request; receiving the search result containing a local application call identifier; and calling a local application in the mobile terminal according to the local application call identifier, and displaying the search result via the local application.

3 Claims, 4 Drawing Sheets

(56) References Cited

FOREIGN PATENT DOCUMENTS

JP      2010527467 A    8/2010
WO      2013012654 A2   1/2013

OTHER PUBLICATIONS

Chinese Patent Application No. 201310676633.X Second Office Action dated Apr. 1, 2016, with English translation, 15 pages.
European Patent Application No. 14196015.3 extended Search Report and Opinion dated Aug. 19, 2015, 6 pages.
European Patent Application No. 14196015.3 Communication pursuant to Article 94(3) EPC dated Aug. 2, 2016, 6 pages.
PCT/CN2014/090571 International Search Report and Written Opinion, with English translation, dated Feb. 17, 2015, 21 pages.
Korean Patent Application No. 10-2014-0175034, Notification of Reasons for Refusal dated Jan. 14, 2016, with English translation, 7 pages.
Japanese Patent Application No. 2016-515650, Notification of Reasons for Refusal dated Oct. 25, 2016, with English translation, 6 pages.

* cited by examiner

METHOD AND DEVICE FOR DISPLAYING SEARCH RESULT ON MOBILE TERMINAL

CROSS-REFERENCE TO RELATED APPLICATION

This application claims priority to and benefits of Chinese Patent Application Serial No. 201310676633.X, filed with the State Intellectual Property Office of P. R. China on Dec. 11, 2013, the entire content of which is incorporated herein by reference.

FIELD

The present disclosure relates to a mobile internet technology field, and more particularly to a method for displaying a search result on a mobile terminal and a device for displaying a search result on a mobile terminal.

BACKGROUND

With the development of the mobile internet technology, it is increasingly common for a user to use a mobile terminal to perform a WAP (wireless application protocol) search. Generally, when the user performs the WAP search by a browser application, the search result is processed via the browser application, for example, it is possible to open videos, play music, browse pictures, and view maps and news by JS (JavaScript), AJAX (Asynchronous JavaScript and XML), HTML5 (Hypertext Markup Language 5), etc.

SUMMARY

Embodiments of the present disclosure seek to solve at least one of the problems existing in the related art to at least some extent.

A first objective of the present disclosure is to provide a method for displaying a search result on a mobile terminal, which may enhance the ability of the mobile terminal to process the search result and display the search result more intuitively with a better displaying effect.

A second objective of the present disclosure is to provide another method for displaying a search result on a mobile terminal.

A third objective of the present disclosure is to provide a device for displaying a search result on a mobile terminal.

A fourth objective of the present disclosure is to provide another device for displaying a search result on a mobile terminal.

In order to achieve the above objectives, a method for displaying a search result on a mobile terminal according to embodiments of a first aspect of the present disclosure is provided. The method comprises sending a search request; receiving the search result containing a native application call identifier; and calling a native application in the mobile terminal according to the native application call identifier, and displaying the search result via the native application.

With the method for displaying the search result on the mobile terminal according to embodiments of the present disclosure, since the search result contains the native application call identifier, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

In order to achieve the above objectives, a method for displaying a search result on a mobile terminal according to embodiments of a second aspect of the present disclosure is provided. The method comprises receiving a search request; generating the search result containing a native application call identifier; and sending the search result to the mobile terminal, in which the mobile terminal calls a native application in the mobile terminal according to the native application call identifier, and displays the search result via the native application.

With the method for displaying the search result on the mobile terminal according to embodiments of the present disclosure, since the search result containing the native application call identifier is generated, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

In order to achieve the above objectives, a device for displaying a search result on a mobile terminal according to embodiments of a third aspect of the present disclosure is provided. The device comprises a sending module configured to send a search request; a receiving module configured to receive the search result containing a native application call identifier; and a calling module configured to call a native application in the mobile terminal according to the native application call identifier, and to display the search result via the native application.

With the device for displaying the search result on the mobile terminal according to embodiments of the present disclosure, since the search result contains the native application call identifier, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

In order to achieve the above objectives, a device for displaying a search result on a mobile terminal according to embodiments of a fourth aspect of the present disclosure is provided. The device comprises a receiving module configured to receive a search request; a generating module configured to generate the search result containing a native application call identifier; and a sending module configured to send the search result to the mobile terminal, in which the mobile terminal calls a native application in the mobile terminal according to the native application call identifier, and displays the search result via the native application.

With the device for displaying the search result on the mobile terminal according to embodiments of the present disclosure, since the search result containing the native application call identifier is generated, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

In order to achieve the above objectives, a computer readable storage medium according to embodiments of a fifth aspect of the present disclosure is provided. The computer readable storage medium comprises a computer program for executing the method for displaying the search result on the mobile terminal according to embodiments of the first aspect of the present disclosure, when running on a computer.

In order to achieve the above objectives, a computer readable storage medium according to embodiments of a sixth aspect of the present disclosure is provided. The computer readable storage medium comprises a computer program for executing the method for displaying the search result on the mobile terminal according to embodiments of the second aspect of the present disclosure, when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
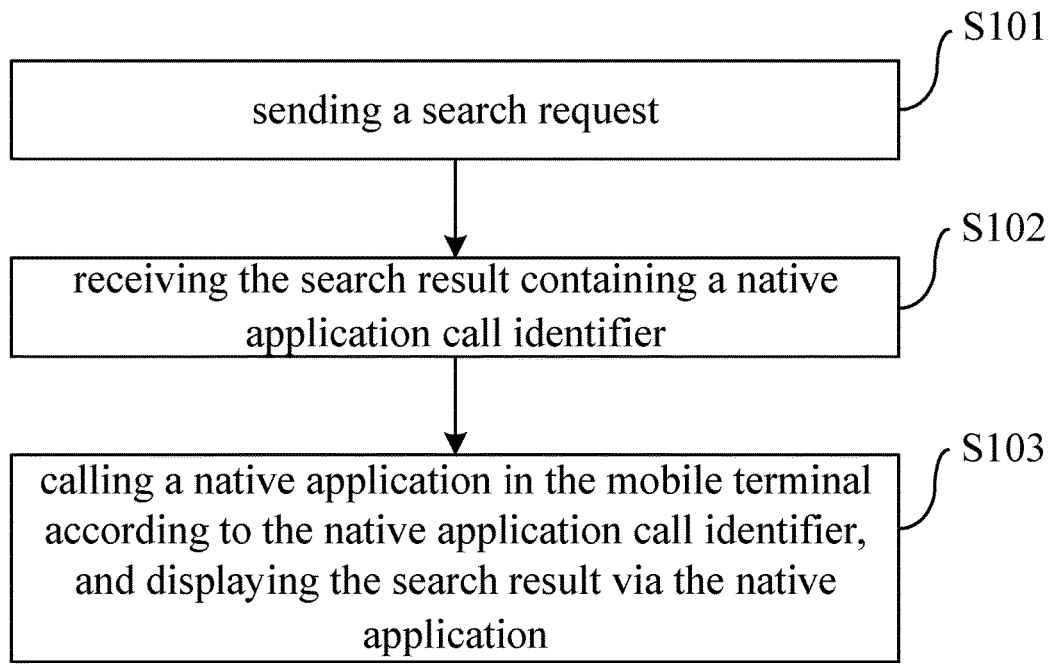
FIG. 1 is a flow chart of a method for displaying a search result on a mobile terminal according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the present disclosure, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the process of performing the WAP search and processing a search result by a browser application in the related art, due to the limitation of the browser application, when the search result is displayed, the performance of the mobile terminal cannot be made full use of, such that the ability of the mobile terminal to process the search result is low, the search result cannot be displayed well, and thus the experience of the user is poor. However, if the search result may be displayed via a native application, it is possible to enhance the ability of the mobile terminal to process the search result and to display the search result more intuitively with a better displaying effect. Accordingly, a method for displaying a search result on a mobile terminal and a device for displaying a search result on a mobile terminal are provided.

FIG. 1 is a flow chart of a method for displaying a search result on a mobile terminal according to an embodiment of the present disclosure.

As shown in FIG. 1, the method for displaying the search result on the mobile terminal according to an embodiment of the present disclosure comprises the following steps.

In step S101, a search request is sent.

Specifically, a user sends the search request to a server via the mobile terminal. For example, the user sends the search request to a search engine server via a browser application installed in the mobile terminal. The search request comprises a search term. In some embodiments, for example, the mobile terminal may be hardware devices having various operating systems, such as mobile phones, tablet computers, personal digital assistants, or e-book readers.

In step S102, the search result containing a native application call identifier is received.

For example, after receiving the search request, the search engine server performs the search according to the search term to obtain the search result corresponding to the search term and containing the native application call identifier.

In step S103, a native application in the mobile terminal is called according to the native application call identifier, and the search result is displayed via the native application.

Specifically, the native application, i.e. a native application, is a third-party application based on an operating system of the mobile terminal. The user of the mobile terminal may search for information, play audios, or watch videos via the native application. The native application is different from a network application, i.e. a web application. The web application needs to be networked to acquire information, while the native application runs in the mobile terminal locally without being networked. The native application call identifier is an identifier related to the native application, according to which the mobile terminal may call the native application. For example, if the search result is a video result, the mobile terminal may call a corresponding video player according to the corresponding call identifier.

In one embodiment, calling the native application in the mobile terminal according to the native application call identifier comprises: if the search result contains the native application call identifier, the mobile terminal sends a call instruction containing the native application call identifier to a local service; and starting by the mobile terminal a corresponding native application according to the call instruction, and transmitting by the mobile terminal the search result to the native application for displaying the search result. Specifically, after obtaining the search result, the server adds the native application call identifier to the search result and supplies the search result containing the native application call identifier to the mobile terminal, and the mobile terminal sends the call instruction containing the native application call identifier to the local service of the mobile terminal according to the native application call identifier. The local service, like a web service, is present in the mobile terminal, and is shared by native applications. If there are a plurality of services, calling is performed mainly based on the highest version of service. For example, if native applications of a video type, a music type, and a picture type integrated with services v1.0, v2.0, v3.0 respectively are installed in the mobile terminal, only the service v3.0 of the picture type runs in the background of the mobile terminal to communicate with a webpage, and the native application of the video type and the native application of the music type share the service v3.0. Then, the mobile terminal starts a corresponding native application according to the call instruction via the local service, and transmits the search result to the native application via the local service so as to display the search result. For example, the mobile terminal transmits data from a search result page to the native application in accordance with the HTTP (hypertext transfer protocol) via the local service, and the native application displays the transmitted data directly.

With the method for displaying the search result on the mobile terminal according to embodiments of the present disclosure, since the search result contains the native application call identifier, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

Figure 2:
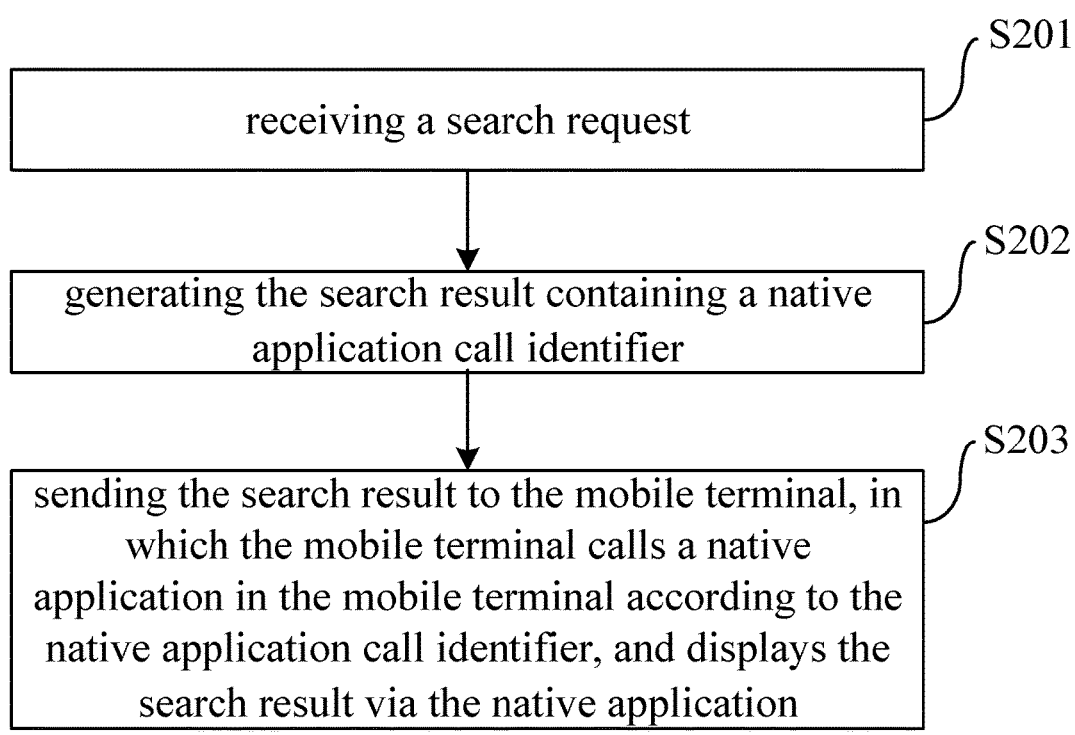
FIG. 2 is a flow chart of a method for displaying a search result on a mobile terminal according to another embodiment of the present disclosure.

FIG. 2 is a flow chart of a method for displaying a search result on a mobile terminal according to another embodiment of the present disclosure.

As shown in FIG. 2, the method for displaying the search result on the mobile terminal according to another embodiment of the present disclosure comprises the following steps.

In step S201, a search request is received.

Specifically, a user sends the search request to a server via the mobile terminal. For example, the user sends the search request to a search engine server via a browser application installed in the mobile terminal. The search request comprises a search term. In some embodiments, for example, the mobile terminal may be hardware devices having various operating systems, such as mobile phones, tablet computers, personal digital assistants, or e-book readers.

In step S202, the search result containing a native application call identifier is generated.

For example, after receiving the search request, the search engine server performs the search according to the search term to obtain the search result corresponding to the search term, and adds the native application call identifier to the search result.

In step S203, the search result is sent to the mobile terminal, in which the mobile terminal calls a native application in the mobile terminal according to the native application call identifier, and displays the search result via the native application.

Specifically, the native application, i.e. a native application, is a third-party application based on an operating system of the mobile terminal. The user of the mobile terminal may search for information, play audios, or watch videos via the native application. The native application is different from a network application, i.e. a web application. The web application needs to be networked to acquire information, while the native application runs in the mobile terminal locally without being networked. The native application call identifier is an identifier related to the native application, according to which the mobile terminal may call the native application. For example, if the search result is a video result, the mobile terminal may call a corresponding video player according to the corresponding call identifier.

In one embodiment, calling the native application in the mobile terminal according to the native application call identifier comprises: if the search result contains the native application call identifier, the mobile terminal sends a call instruction containing the native application call identifier to a local service; and starting by the mobile terminal a corresponding native application according to the call instruction, and transmitting by the mobile terminal the search result to the native application for displaying the search result. Specifically, after obtaining the search result, the server adds the native application call identifier to the search result and supplies the search result containing the native application call identifier to the mobile terminal, and the mobile terminal sends the call instruction containing the native application call identifier to the local service of the mobile terminal according to the native application call identifier. The local service, like a web service, is present in the mobile terminal, and is shared by native applications. If there are a plurality of services, calling is performed mainly based on the highest version of service. For example, if native applications of a video type, a music type, and a picture type integrated with services v1.0, v2.0, v3.0 respectively are installed in the mobile terminal, only the service v3.0 of the picture type runs in the background of the mobile terminal to communicate with a webpage, and the native application of the video type and the native application of the music type share the service v3.0. Then, the mobile terminal starts a corresponding native application according to the call instruction via the local service, and transmits the search result to the native application via the local service so as to display the search result. For example, the mobile terminal transmits data from a search result page to the native application in accordance with the HTTP (hypertext transfer protocol) via the local service, and the native application displays the transmitted data directly.

With the method for displaying the search result on the mobile terminal according to embodiments of the present disclosure, since the search result containing the native application call identifier is generated, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

In order to display the search result conveniently and accurately, it is necessary to specifically add a call identifier to the search result. For example, a search result of a webpage type does not need to be displayed by calling a native application.

Figure 3:
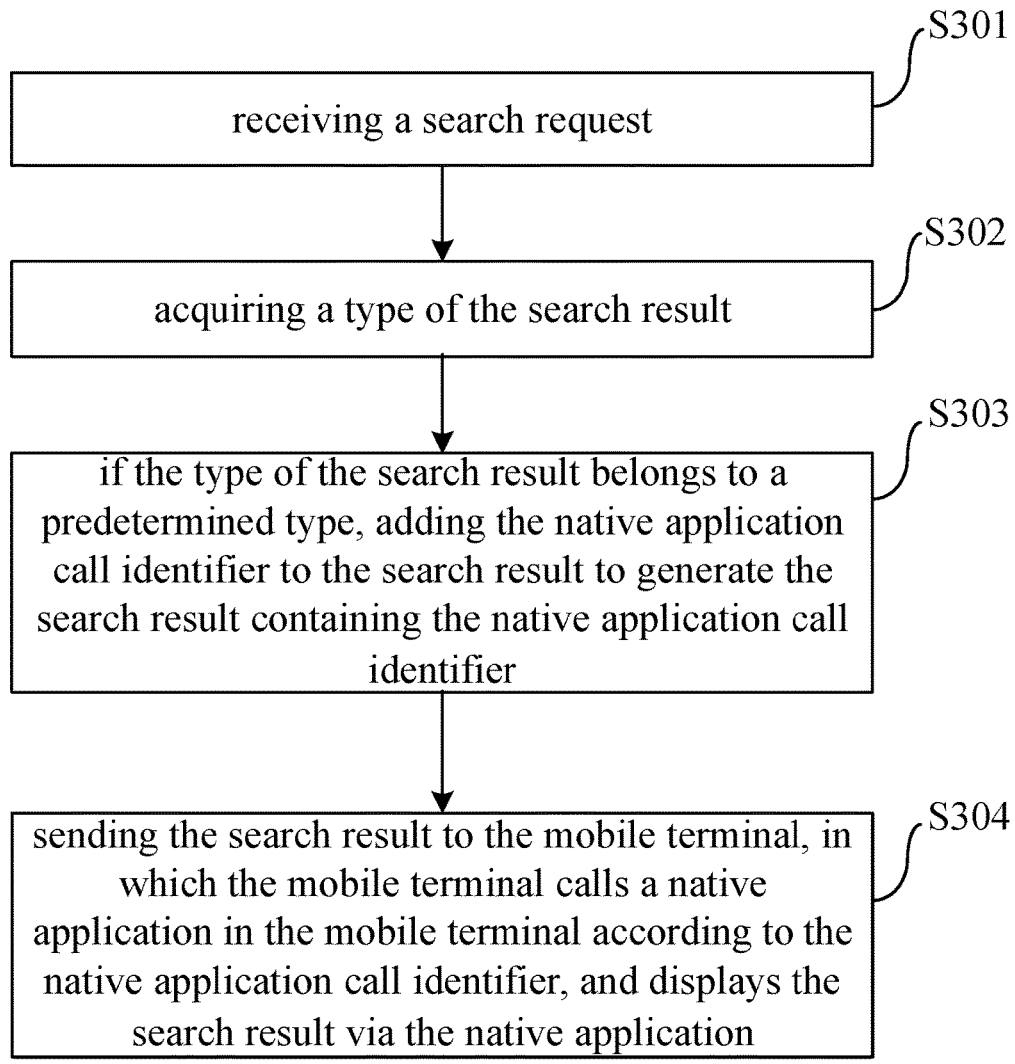
FIG. 3 is a flow chart of a method for displaying a search result on a mobile terminal according to still another embodiment of the present disclosure.

FIG. 3 is a flow chart of a method for displaying a search result on a mobile terminal according to still another embodiment of the present disclosure.

As shown in FIG. 3, the method for displaying the search result on the mobile terminal comprises the following steps.

In step S301, a search request is received.

In step S302, a type of the search result is acquired.

Specifically, after the search result is obtained according to a search term, the type of the search result is first acquired. For example, the type of the search result comprises a video type, an audio type and a picture type. More specifically, the type of the search result may be acquired according to a tag or a script application in a webpage. The acquiring of the type of the search result may be determined according to a particular webpage, which is not limited herein.

In step S303, if the type of the search result belongs to a predetermined type, the native application call identifier is added to the search result to generate the search result containing the native application call identifier.

Specifically, after the type of the search result is acquired, whether the type of the search result belongs to the predetermined type is determined. For example, the predetermined type may be a video type, an audio type or a picture type. If the type of the search result belongs to the predetermined type, the native application call identifier is added to the search result, i.e. the search result of the predetermined type may be opened or displayed via the native application.

If it is determined that the type of the search result does not belong to the predetermined type, the native application call identifier does not need to be added to the search result.

In step S304, the search result is sent to the mobile terminal, in which the mobile terminal calls a native application in the mobile terminal according to the native application call identifier, and displays the search result via the native application.

With the method for displaying the search result on the mobile terminal according to embodiments of the present disclosure, since the native application call identifier is added to the search result if the type of the search result belongs to the predetermined type, it is possible to specifically call the native application according to the search result, such that it is possible to enhance the ability of the mobile terminal to process the search result and to display the search result more intuitively with a better displaying effect.

When the native application call identifier is added, a corresponding native application may not be installed in the mobile terminal, i.e. the server does not know the installation condition of the native application in the mobile terminal, and thus it is impossible to provide a more accurate call identifier. In order to calling the native application according to the search result reliably, when sending the search result, the mobile terminal may also send a mobile terminal identifier to the server, such that the server may identify the mobile terminal uniquely.

Figure 4:
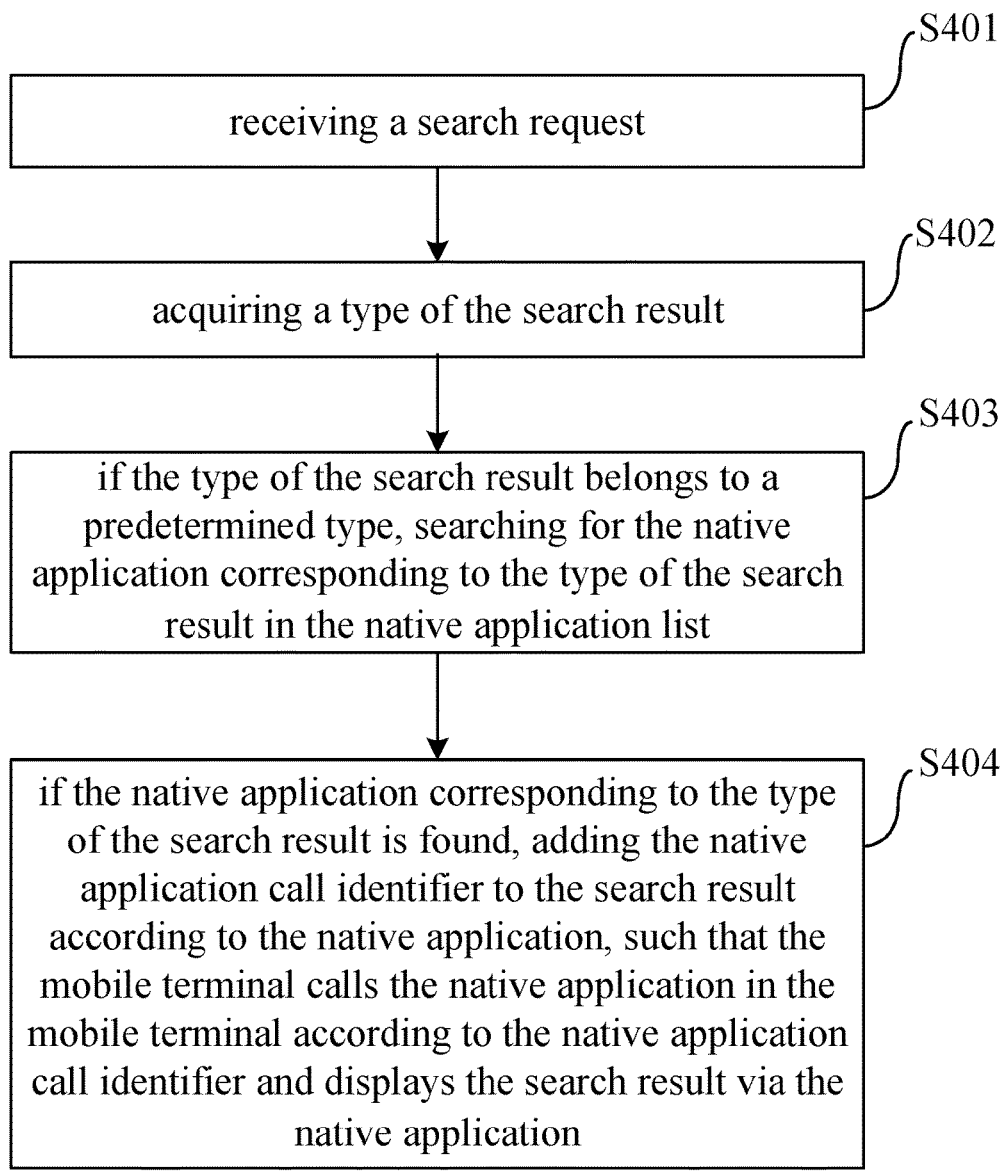
FIG. 4 is a flow chart of a method for displaying a search result on a mobile terminal according to yet another embodiment of the present disclosure.

FIG. 4 is a flow chart of a method for displaying a search result on a mobile terminal according to yet another embodiment of the present disclosure.

As shown in FIG. 4, the method for displaying the search result on the mobile terminal comprises the following steps.

In step S401, a search request is received.

In step S402, a type of the search result is acquired.

In step S403, if the type of the search result belongs to a predetermined type, a native application corresponding to the type of the search result is searched for in a native application list.

In one embodiment, the search request comprises a mobile terminal identifier corresponding to a native application list of the mobile terminal. The native application list comprises the name and the type of native applications installed in the mobile terminal, etc.

In step S404, if the native application corresponding to the type of the search result is found, the native application call identifier is added to the search result according to the native application, such that the mobile terminal calls the native application in the mobile terminal according to the native application call identifier and displays the search result via the native application.

Specifically, the server acquires a unique identifier of the mobile terminal in the search request, and the unique identifier of the mobile terminal corresponds to the native application list of the mobile terminal. In one embodiment, the native application list is uploaded by the mobile terminal at a predetermined time interval. When the native application corresponding to the type of the search result is searched for in the native application list, if the native application corresponding to the type of the search result is found, the native application call identifier is added to the search result according to the native application, and the search result is supplied to the mobile terminal. At this time, the mobile terminal sends a call instruction containing the native application call identifier to a local service, starts a corresponding native application according to the call instruction, and transmits the search result to the native application so as to display the search result. For example, the mobile terminal transmits data from a search result page to the native application in accordance with the HTTP (hypertext transfer protocol), and the native application displays the transmitted data.

In one embodiment, the method for displaying the search result on the mobile terminal further comprises adding a recommendation of the native application to the search result according to the type of the search result if the native application corresponding to the type of the search result is not found in the native application list. At this time, the user may install the native application according to the recommendation, and then open the search result previously clicked so as to display the search result.

With the method for displaying the search result on the mobile terminal according to embodiments of the present disclosure, since the mobile terminal identifier corresponding to the native application list of the mobile terminal is included in the search request, the server may specifically add the call identifier according to the native application list, such that the native application may display the search result more accurately so as to improve the experience of the user, and the native application may be promoted so as to have a commercial value.

In order to achieve the above embodiments, a device for displaying a search result on a mobile terminal is also provided.

Figure 5:
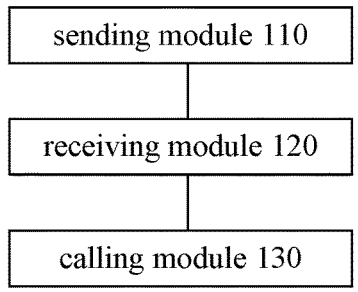
FIG. 5 is a block diagram of a device for displaying a search result on a mobile terminal according to an embodiment of the present disclosure.

FIG. 5 is a block diagram of a device for displaying a search result on a mobile terminal according to an embodiment of the present disclosure.

As shown in FIG. 5, the device for displaying the search result on the mobile terminal comprises a sending module 110, a receiving module 120 and a calling module 130.

The sending module 110 is configured to send a search request. Specifically, a user sends the search request to a server via the sending module 110 of the mobile terminal. For example, the user sends the search request to the server via a browser application installed in the mobile terminal. The search request comprises a search term. In some embodiments, for example, the mobile terminal may be hardware devices having various operating systems, such as mobile phones, tablet computers, personal digital assistants, or e-book readers.

The receiving module 120 is configured to receive the search result containing a native application call identifier. For example, after receiving the search request comprising the search term, the receiving module 120 performs the search according to the search term to obtain the search result corresponding to the search term and containing the native application call identifier.

The calling module 130 is configured to call a native application in the mobile terminal according to the native application call identifier, and to display the search result via the native application.

Specifically, the native application, i.e. a native application, is a third-party application based on an operating system of the mobile terminal. The user of the mobile terminal may search for information, play audios, or watch videos via the native application. The native application is different from a network application, i.e. a web application. The web application needs to be networked to acquire information, while the native application runs in the mobile terminal locally without being networked. The native application call identifier is an identifier related to the native application, according to which the mobile terminal may call the native application. For example, if the search result is a video result, the mobile terminal may call a corresponding video player according to the corresponding call identifier.

The mobile terminal sends the call instruction containing the native application call identifier to the local service of the mobile terminal according to the native application call identifier. The local service, like a web service, is present in the mobile terminal, and is shared by native applications. If there are a plurality of services, calling is performed mainly based on the highest version of service. For example, if native applications of a video type, a music type, and a picture type integrated with services v1.0, v2.0, v3.0 respectively are installed in the mobile terminal, only the service v3.0 of the picture type runs in the background of the mobile terminal to communicate with a webpage, and the native application of the video type and the native application of the music type share the service v3.0. Then, the mobile terminal starts a corresponding native application according to the call instruction via the local service, and transmits the search result to the native application via the local service so as to display the search result. For example, the mobile terminal transmits data from a search result page to the native application in accordance with the HTTP (hypertext transfer protocol) via the local service, and the native application displays the transmitted data directly.

With the device for displaying the search result on the mobile terminal according to embodiments of the present disclosure, since the search result contains the native application call identifier, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

Figure 6:
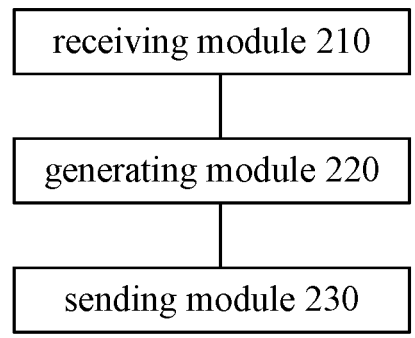
FIG. 6 is a block diagram of a device for displaying a search result on a mobile terminal according to another embodiment of the present disclosure.

FIG. 6 is a block diagram of a device for displaying a search result on a mobile terminal according to another embodiment of the present disclosure.

As shown in FIG. 6, the device for displaying the search result on the mobile terminal comprises a receiving module 210, a generating module 220 and a sending module 230.

The receiving module 210 is configured to receive a search request. Specifically, a user sends the search request to the receiving module 210 via the mobile terminal. For example, the user sends the search request via a browser application installed in the mobile terminal. The search request comprises a search term. In some embodiments, for example, the mobile terminal may be hardware devices having various operating systems, such as mobile phones, tablet computers, personal digital assistants, or e-book readers.

The generating module 220 is configured to generate the search result containing a native application call identifier. For example, after receiving the search request, the generating module 220 performs the search according to the search term to obtain the search result corresponding to the search term, and adds the native application call identifier to the search result.

The sending module 230 is configured to send the search result to the mobile terminal, in which the mobile terminal calls a native application in the mobile terminal according to the native application call identifier, and displays the search result via the native application.

Specifically, the native application, i.e. a native application, is a third-party application based on an operating system of the mobile terminal. The user of the mobile terminal may search for information, play audios, or watch videos via the native application. The native application is different from a network application, i.e. a web application. The web application needs to be networked to acquire information, while the native application runs in the mobile terminal locally without being networked. The native application call identifier is an identifier related to the native application, according to which the mobile terminal may call the native application. For example, if the search result is a video result, the mobile terminal may call a corresponding video player according to the corresponding call identifier.

In one embodiment, calling the native application in the mobile terminal according to the native application call identifier comprises: if the search result contains the native application call identifier, the mobile terminal sends a call instruction containing the native application call identifier to a local service; and starting by the mobile terminal a corresponding native application according to the call instruction, and transmitting by the mobile terminal the search result to the native application for displaying the search result. Specifically, after obtaining the search result, the server adds the native application call identifier to the search result and supplies the search result containing the native application call identifier to the mobile terminal, and the mobile terminal sends the call instruction containing the native application call identifier to the local service of the mobile terminal according to the native application call identifier. The local service, like a web service, is present in the mobile terminal, and is shared by native applications. If there are a plurality of services, calling is performed mainly based on the highest version of service. For example, if native applications of a video type, a music type, and a picture type integrated with services v1.0, v2.0, v3.0 respectively are installed in the mobile terminal, only the service v3.0 of the picture type runs in the background of the mobile terminal to communicate with a webpage, and the native application of the video type and the native application of the music type share the service v3.0. Then, the mobile terminal starts a corresponding native application according to the call instruction via the local service, and transmits the search result to the native application via the local service so as to display the search result. For example, the mobile terminal transmits data from a search result page to the native application in accordance with the HTTP (hypertext transfer protocol) via the local service, and the native application displays the transmitted data directly.

With the device for displaying the search result on the mobile terminal according to embodiments of the present disclosure, since the search result containing the native application call identifier is generated, the mobile terminal is capable of calling the native application according to the native application call identifier and displaying the search result. Because of high information processing ability of the native application, it is possible to enhance the ability of the mobile terminal to process the search result and to display the search result more intuitively with a better displaying effect so as to improve the experience of the user.

Figure 7:
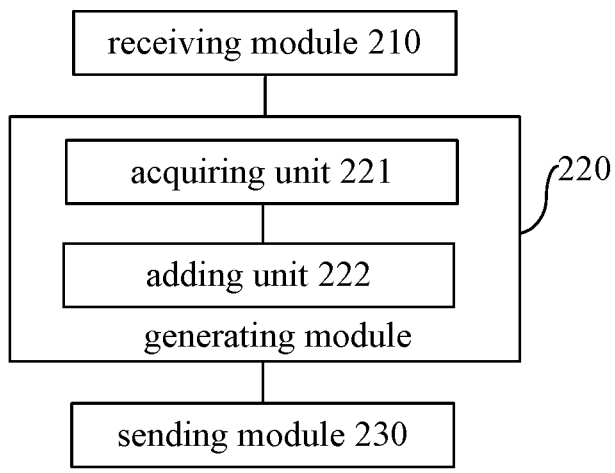
FIG. 7 is a block diagram of a device for displaying a search result on a mobile terminal according to still another embodiment of the present disclosure.

FIG. 7 is a block diagram of a device for displaying a search result on a mobile terminal according to still another embodiment of the present disclosure.

As shown in FIG. 7, the device for displaying the search result on the mobile terminal comprises a receiving module 210, a generating module 220 and a sending module 230. The generating module 220 comprises an acquiring unit 221 and an adding unit 222.

The acquiring unit 221 is configured to acquire a type of the search result. For example, the type of the search result comprises a video type, an audio type and a picture type. More specifically, the type of the search result may be acquired according to a tag or a script application in a webpage. The acquiring of the type of the search result may be determined according to a particular webpage, which is not limited herein.

The adding unit 222 is configured to add the native application call identifier to the search result if the type of the search result belongs to a predetermined type to generate the search result containing the native application call identifier. For example, the predetermined type may be a video type, an audio type or a picture type. If the type of the search result belongs to the predetermined type, the native application call identifier is added to the search result, i.e. the search result of the predetermined type may be opened or displayed via the native application.

In one embodiment, the search request comprises a mobile terminal identifier corresponding to a native application list of the mobile terminal. The adding unit 222 is further configured to search for the native application corresponding to the type of the search result in the native application list, and to add the native application call identifier to the search result according to the native application if the native application corresponding to the type of the search result is found.

In one embodiment, the native application list is uploaded by the mobile terminal at a predetermined time interval. When the native application corresponding to the type of the search result is searched for in the native application list, if the native application corresponding to the type of the search result is found, the native application call identifier is added to the search result according to the native application, and the search result is supplied to the mobile terminal. At this time, the mobile terminal sends a call instruction containing the native application call identifier to a local service, starts a corresponding native application according to the call instruction, and transmits the search result to the native application so as to display the search result. For example, the mobile terminal transmits data from a search result page to the native application in accordance with the HTTP (hypertext transfer protocol), and the native application displays the transmitted data.

In one embodiment, the adding unit 222 is further configured to add a recommendation of the native application to the search result according to the type of the search result if the native application corresponding to the type of the search result is not found. At this time, the user may install the native application according to the recommendation, and then open the search result previously clicked so as to display the search result.

With the device for displaying the search result on the mobile terminal according to embodiments of the present disclosure, since the mobile terminal identifier corresponding to the native application list of the mobile terminal is included in the search request, the server may specifically add the call identifier according to the native application list, such that the native application may display the search result more accurately so as to improve the experience of the user, and the native application may be promoted so as to have a commercial value.

A computer readable storage medium according to embodiments of the present disclosure is also provided. The computer readable storage medium comprises a computer program for executing the method for displaying the search result on the mobile terminal according to the above embodiments of the present disclosure, when running on a computer.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method executed by software instructions on a hardware processor for displaying a search result on a mobile terminal, comprising:
   sending a search request, wherein the search request comprises a mobile terminal identifier corresponding to a native application list of the mobile terminal;
   receiving the search result containing a native application call identifier; and
   calling a native application in the mobile terminal according to the native application call identifier via, and displaying the search result via the native application,
   wherein, the search result containing the native application call identifier is generated by:
   acquiring a type of the search result; and
   when the type of the search result belongs to a predetermined type, adding the native application call identifier to the search result to generate the search result containing the native application call identifier, wherein the predetermined type includes at least one of a video type, an audio type and a picture type;
   wherein, adding the native application call identifier to the search result comprises:
   searching for the native application corresponding to the type of the search result in the native application list;
   when the native application corresponding to the type of the search result is found, adding the native application call identifier to the search result according to the native application; and
   when the native application corresponding to the type of the search result is not found, adding a recommendation of the native application to the search result according to the type of the search result;
   wherein calling a native application in the mobile terminal according to the native application call identifier comprises:
   sending a call instruction containing the native application call identifier to a local service;
   starting a corresponding native application according to the call instruction; and
   transmitting the search result to the native application and displaying the search result via the native application, wherein the native application is at least one of native applications of a video type, a music type, and a picture type corresponding to the type of the search result.

2. A device for displaying a search result on a mobile terminal, comprising:
   a processor;
   a memory, configured to store instructions executable by the processor,
   wherein the processor is configured to:
   send a search request, wherein the search request comprises a mobile terminal identifier corresponding to a native application list of the mobile terminal;
   receive the search result containing a native application call identifier; and
   call a native application in the mobile terminal according to the native application call identifier, and display the search result via the native application,
   wherein, the search result containing the native application call identifier is generated by:
   acquiring a type of the search result; and
   when the type of the search result belongs to a predetermined type, adding the native application call identifier to the search result to generate the search result containing the native application call identifier, wherein the predetermined type includes at least one of a video type, an audio type and a picture type;
   wherein, adding the native application call identifier to the search result comprises:
   searching for the native application corresponding to the type of the search result in the native application list;
   when the native application corresponding to the type of the search result is found, adding the native application call identifier to the search result according to the native application; and
   when the native application corresponding to the type of the search result is not found, adding a recommendation of the native application to the search result according to the type of the search result;
   wherein in order to call a native application in the mobile terminal according to the native application call identifier the processor is configured to:
   send a call instruction containing the native application call identifier to a local service;
   start a corresponding native application according to the call instruction; and
   transmit the search result to the native application and displaying the search result via the native application, wherein the native application is at least one of native applications of a video type, a music type, and a picture type corresponding to the type of the search result.

3. A non-transitory computer readable storage medium, comprising a computer program, when running on a computer, for executing steps of:
   sending a search request;
   receiving a search result containing a native application call identifier; and
   calling a native application in a mobile terminal according to the native application call identifier, and displaying the search result on the mobile terminal via the native application;
   wherein, the search result containing the native application call identifier is generated by:
   acquiring a type of the search result; and
   when the type of the search result belongs to a predetermined type, adding the native application call identifier to the search result to generate the search result containing the native application call identifier, wherein the predetermined type includes at least one of a video type, an audio type and a picture type;
   wherein, adding the native application call identifier to the search result comprises:
   searching for the native application corresponding to the type of the search result in the native application list;

when the native application corresponding to the type of the search result is found, adding the native application call identifier to the search result according to the native application; and when the native application corresponding to the type of the search result is not found, adding a recommendation of the native application to the search result according to the type of the search result, wherein calling a native application in the mobile terminal according to the native application call identifier comprises:

sending a call instruction containing the native application call identifier to a local service;

starting a corresponding native application according to the call instruction; and transmitting the search result to the native application and displaying the search result via the native application, wherein the native application is at least one of native applications of a video type, a music type, and a picture type corresponding to the type of the search result.

* * * * *